July 28, 1953 C. J. CADWELL ET AL 2,646,956
TRIPOD
Filed Dec. 17, 1948 3 Sheets-Sheet 1
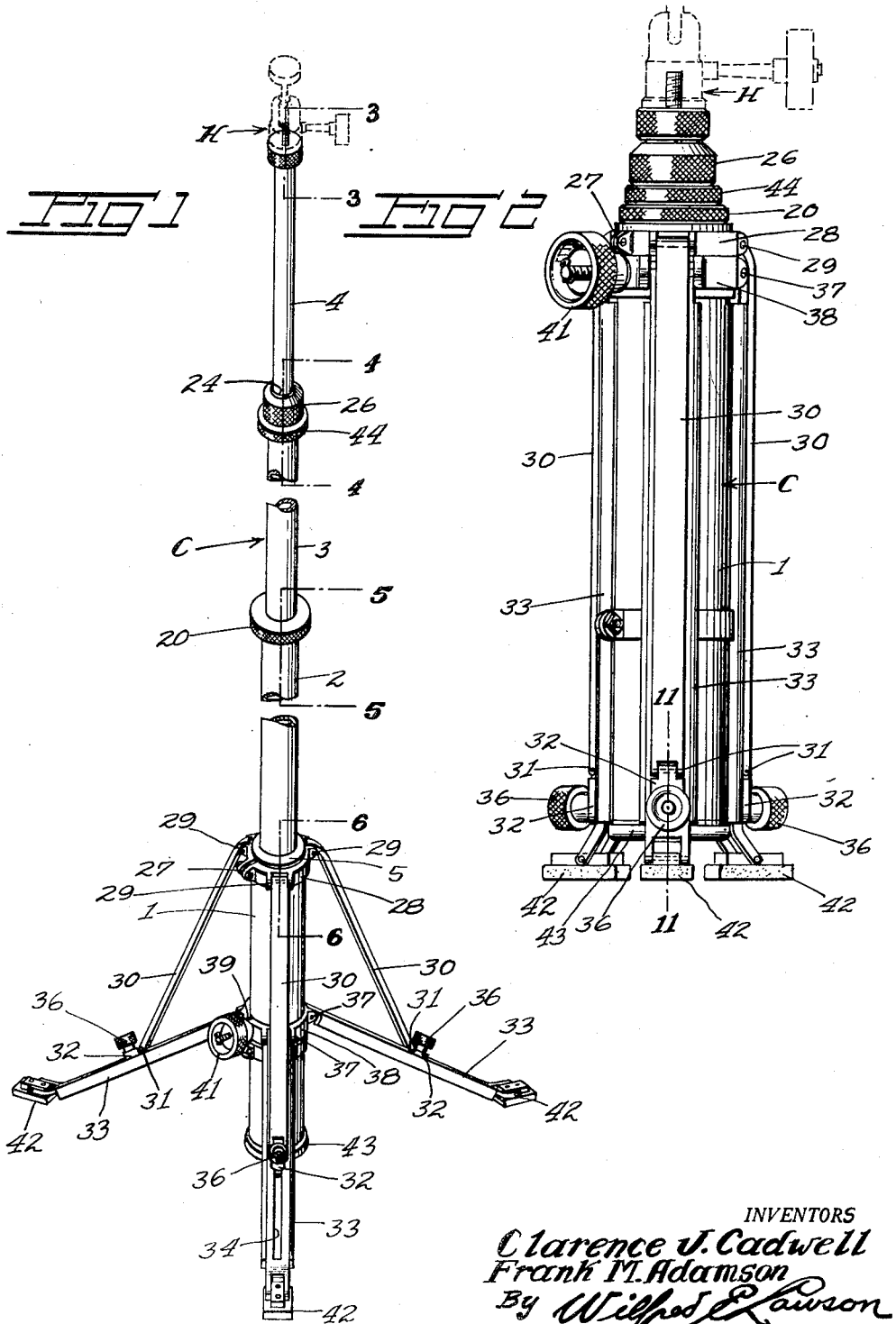
INVENTORS
Clarence J. Cadwell
Frank M. Adamson
By Wilfred Lawson
Attorney July 28, 1953  C. J. CADWELL ET AL  2,646,956
TRIPOD
Filed Dec. 17, 1948  3 Sheets-Sheet 2
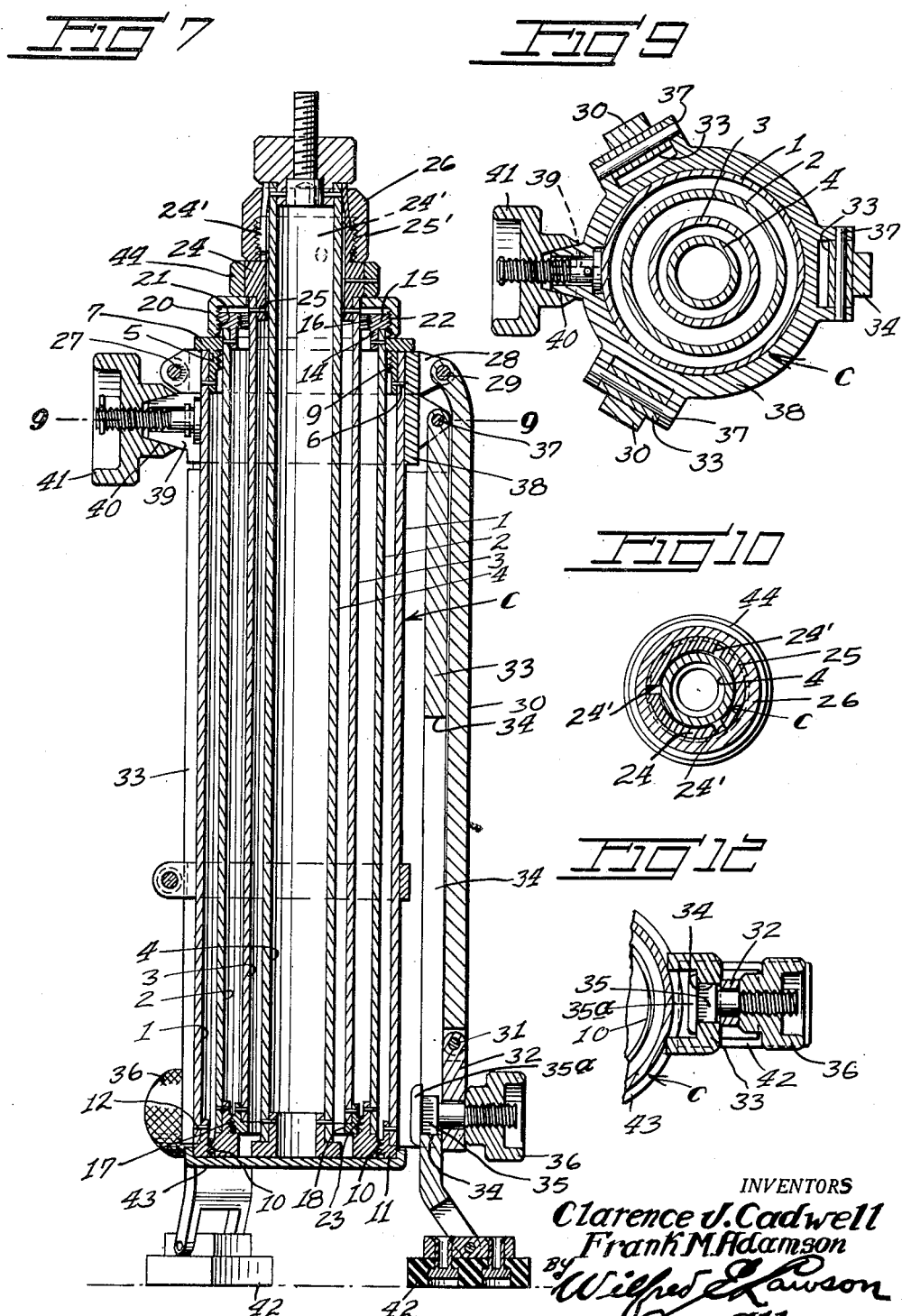
INVENTORS
Clarence J. Cadwell
Frank M. Adamson
By Wilfred Lawson
Attorney

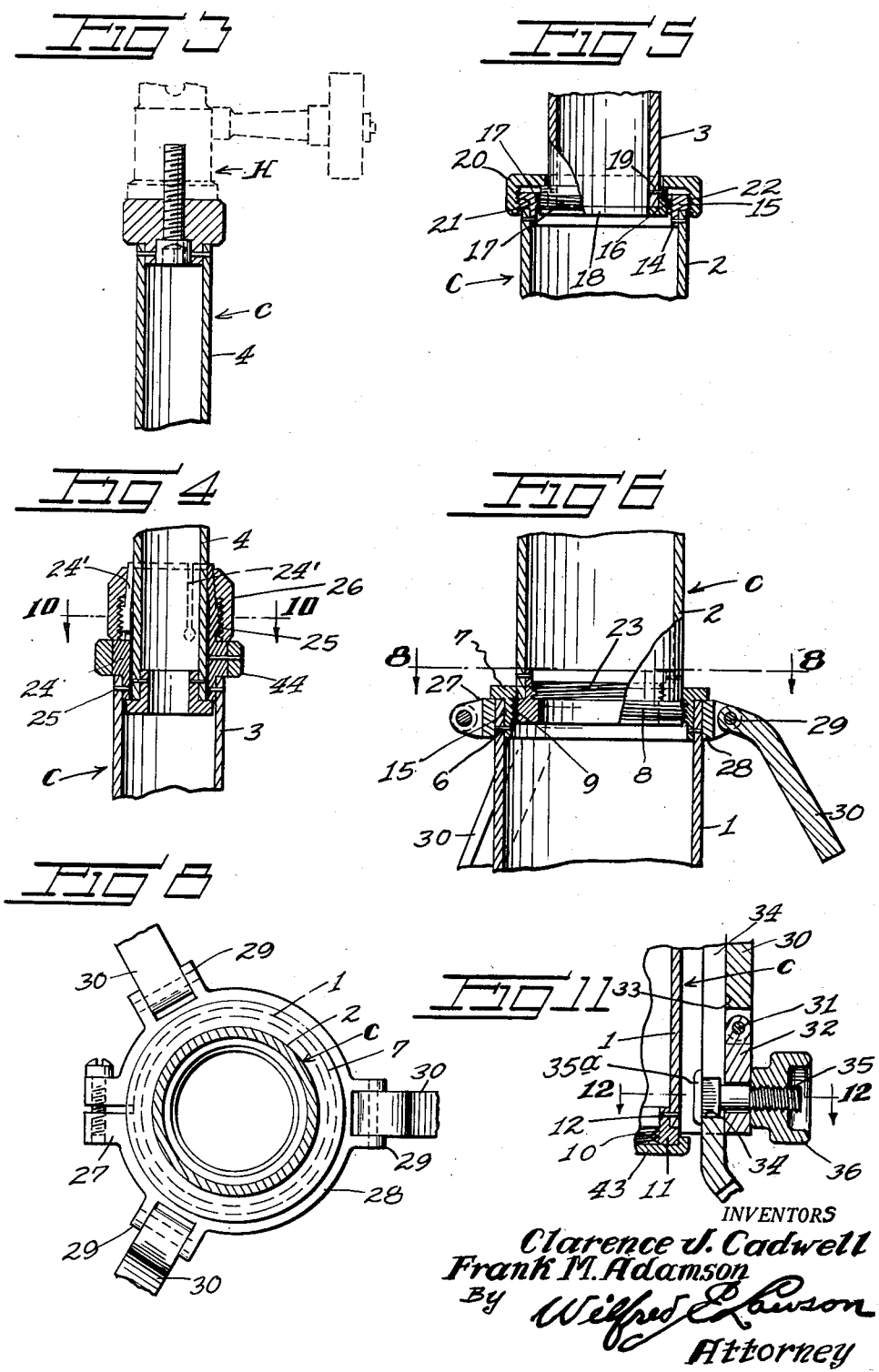

Patented July 28, 1953

2,646,956

UNITED STATES PATENT OFFICE 2,646,956

TRIPOD

Clarence J. Cadwell, Carpinteria, and Frank M. Adamson, Los Angeles, Calif., assignors to The Cadwell Corporation, Beverly Hills, Calif., a corporation of California Application December 17, 1948, Serial No. 65,894

3 Claims. (Cl. 248—170)

This invention relates to a tripod upon which a camera or other object may be readily mounted and it is an object of the invention to provide a tripod embodying means whereby the object mounted on the tripod may be maintained at selected elevations.

It is also an object of the invention to provide a device of this kind constructed in a manner whereby the same may be readily compacted for storage or transportation.

Furthermore it is an object of the invention to provide a device of this kind including a column adjustable as to length and wherein means are provided for maintaining such column in a substantially vertical position.

An additional object of the invention is to provide a device of this kind including a column and supporting legs therefor, said legs being operatively engaged with the column in a manner to permit adjustment of the legs toward or from the column as may be determined by the area upon which the tripod is to be positioned.

The invention consists in the details of construction and in the combination of the several parts of our improved tripod whereby certain advantages are attained, as will be hereinafter more fully set forth.

In order that our invention may be better understood, we will now proceed to describe the same with reference to the accompanying drawings, wherein:

Figure 1 is a view in perspective of a tripod constructed in accordance with an embodiment of the invention and extended for use, an associated head being shown in broken lines;

Figure 2 is a view in side elevation showing the device compacted, the associated head being shown in broken lines;

Figure 3 is an enlarged fragmentary sectional view taken substantially on the line 3—3 of Figure 1;

Figure 4 is an enlarged detail sectional view taken substantially on the line 4—4 of Figure 1;

Figure 5 is an enlarged detail sectional view taken substantially on the line 5—5 of Figure 1;

Figure 6 is a view similar to Figure 5 but illustrating the means herein comprised for locking a second intermediate member in extended position;

Figure 7 is a sectional view taken substantially on the line 7—7 of Figure 2, with parts in elevation;

Figure 8 is a sectional view taken substantially on the line 8—8 of Figure 6, looking in the direction of the arrows;

Figure 9 is a sectional view taken substantially on the line 9—9 of Figure 7;

Figure 10 is a sectional view taken substantially on the line 10—10 of Figure 4;

Figure 11 is an enlarged detail sectional view taken substantially on the line 11—11 of Figure 2; and Figure 12 is a sectional view taken substantially on the line 12—12 of Figure 11.

In the embodiment of the invention as illustrated in the accompanying drawings, C denotes a column including four elongated sections 1, 2, 3 and 4. These sections are of predetermined lengths and tubular with each of the upper sections slidably and telescopically engaging within the section immediately below. The sections 1, 2, 3 and 4 are of such lengths as to have the section 4 substantially entirely housed in section 3 when the section 4 is in its fully retracted position; section 3 when fully retracted is substantially entirely housed within the section 2; and when retracted section 2 is substantially housed in section 1.

Snugly fitting in the upper portion of the bottom section 1, is a sleeve 5 fixedly held in place by the pins 6 or otherwise as may be preferred. The outer end of the sleeve 5 is provided with a surrounding flange 7 which abuts the adjacent end of the section 1.

The lower or inner end portion of the section 2 of the column C snugly passes through the sleeve 5 and the inner or inserted end of the section 2 is provided therearound with a heavy duty external thread 8 which engages an internal thread 9 provided in the outer end portion of the sleeve 5 and extending therearound.

The outward or extended movement of the section 2 with respect to the section 1 is determined by contact of the external thread 8 with the inner end of the sleeve 5 and when the section 2 is fully withdrawn or extended turning movement of the section 2 to the right will cause the thread 8 to engage the internal thread 9 of sleeve 5, and thus hold the section 2 in its fully extended or withdrawn position.

When the section 2 is substantially fully retracted the external thread 8 upon anti-clockwise rotation of the section 2, engages within an internal thread 10 within a sleeve 11 keyed as at 12 or otherwise rigidly held within the lower end portion of the bottom section 1.

Snugly fitted within the outer or top portion of the section 2, is a sleeve 14 having an outstanding surrounding flange 15 outwardly of and in close contact within the associated outer end of the section 2. The outer end portion of the sleeve 14 is provided therearound with a heavy duty internal thread 16, with which engages an external male thread 17 circumferentially disposed around a collar 18, pinned as at 19 or otherwise rigidly secured with the lower or bottom extremity of the section 3 of the column C. The threads 16 and 17 engage when the section 3 is substantially fully extended and after such engagement the section 3 is further locked in extended position by the cap 20 freely mounted on the section 3 and engages the peripheral threads 21 on the flange 15.

When the section 3 is substantially fully retracted, the external thread 17 upon requisite rotation of the section 3, engages an internal thread 23 within the lower or inserted extremity of the section 2.

Snugly fitting within the outer end portion of the section 3 is a collet 24 pinned as at 25, or otherwise fixedly secured to the section 3. The collet 24 extends outwardly beyond the section 3 and said extended portion of the collet is longitudinally split as at 24', and said extended portion is outwardly tapered. The inner part of the extended portion of the collet is provided with the external threads 25' with which engages a tapered nut 26 so that as the nut 26 is turned to move inwardly the extended portion of the collet will be contracted and brought into close clamping contact with the inner portion of the outer or top section 4 of the column C. It is believed obvious, that the section 4 may be effectively held in any desired lengthwise adjustment with respect to the section 3. Furthermore, it is to be pointed out that the section 4 permits a fine adjustment of the head H carried by the outer extremity of the section 4 and that such fine adjustment may be obtained independently of the adjustments afforded by the extending of either of the sections 2 and 3. It is to be further noted that the section 3 may be outwardly adjusted independently of the section 2.

Clamped, as at 27, to the upper end portion of the bottom section 1 is a split band 28 with which is hingedly connected as at 29, the elongated leg bracing arms 30. These arms are herein disclosed as three in number and substantially equidistantly spaced around the band 28.

The arms 30 are of equal lengths and the outer extremities of the arms 30 are hingedly connected as at 31 to a slide plate 32 positioned for movement lengthwise of a leg 33. The plate 32 also bridges a slot 34 extending along the leg 33 from a point close to its outer end for a material distance inwardly thereof.

Extending from the inner side of the leg 33 outwardly through the slot 34 is a shank 35 provided at its inner end with a head 35a of a diameter greater than the width of the slot 34 to permit the head to have desired clamping contact with the inner face of the leg 33. The shank 35 is of a length to extend through and outwardly beyond the slide plate 32. Threaded on the outer extended end portion of the shank 35 for clamping contact with the slide plate 32 is a nut 36.

The legs 33 have their inner end portions hingedly connected as at 37 with a collar 38 snugly but freely surrounding the bottom section 1.

The collar 38 is split, as at 39, and extending outwardly from the adjacent free extremities of the collar are the tapered and semi-circular bosses 40 upon which threads a hand wheel 41 whereby the collar 38 may be held in selected adjustment along the bottom section 1, as determined by the desired spread of the legs 33 as determined by the area available to operatively place the device.

It is also to be noted that each of the legs 33 may be swung outwardly or inwardly with respect to the bottom section 1 independently of the other legs by loosening the clamp afforded by the shank 35 and coacting nut 36. This independent swinging adjustment of the legs 33 permits a ready accommodation when setting the device on an uneven or irregular surface or area.

The outer extremities of the legs 33 are herein disclosed as having pivotally engaged with their outer extremities, the feet or pads 42 which have direct contact with the supporting surface or area.

The lower end of the bottom section 1 has removably engaged therewith a cap 43 which when applied prevents dirt or other elements entering the section 1.

To facilitate the desired handling of the device, the outer end portion of the section 3 carries a surrounding collar 44 the periphery of which being knurled or otherwise roughened.

The head H as herein embodied is similar to the head described and claimed in my co-pending application Serial No. 39,439, filed July 19, 1948.

From the foregoing description it is thought to be obvious that a tripod constructed in accordance with my invention is particularly well adapted for use by reason of the convenience and facility with which it may be used and operated.

I claim:

1. A tripod structure comprising a plurality of slidably, interengaged tubular sections, interconnecting internal and external screw threads at the inner and outer ends of the sections, the sections when fully telescoped one into the other being adapted upon relative rotation in one direction to be threadedly joined together by the screw threads at their corresponding ends and when fully withdrawn being adapted upon relative rotation in the opposite direction to be threadedly joined together by the screw threads at their dissimilar ends, a central tubular section freely slidable in the innermost one of the plurality of sections, a clamping collar upon the outer end of the said innermost section and having the said central section slidable therethru, means carried upon the inner end of the central section for engaging said collar to limit the outward movement of the central section, means for effecting gripping engagement of the clamping collar with the central section to maintain the latter in an adjusted position in the said innermost section, means for mounting a body upon the outer end of the central section, and means connected with the outermost one of the plurality of sections for supporting the tripod.

2. The tripod structure as defined in claim 1, with the said supporting means comprising a collar fixedly mounted on the upper end of the said outermost of said sections, a clamp collar adjustably engaged on the outermost section, legs spacedly hinged at one of their ends to the clamp collar, and brace members pivoted at their upper ends to the first collar and adjustably secured at their lower ends to the legs toward the lower ends thereof.

3. The tripod structure as defined in claim 1, with the said supporting means comprising a collar fixedly mounted on the upper end of the said outermost of said sections, a clamp collar adjustably engaged on the outermost section, legs spacedly hinged at one of their ends to the clamp collar, the lower end portions of said legs being longitudinally slotted, brace members pivoted at their upper ends to the first collar, and means slidably engaged in the said slots for adjustably securing the lower ends of said brace members to the legs.

CLARENCE J. CADWELL.
    FRANK M. ADAMSON.

References Cited in the file of this patent
UNITED STATES PATENTS

| Number | Name | Date |
|---|---|---|
| 414,903 | Godillot | Nov. 12, 1889 |
| 629,460 | Nagell | July 25, 1899 |
| 714,043 | Seitz | Nov. 18, 1902 |
| 754,502 | Rockwell | Mar. 15, 1904 |
| 1,175,352 | Hand | Mar. 14, 1916 |
| 1,177,072 | Warman | Mar. 28, 1916 |
| 1,185,732 | Swayne | June 6, 1916 |
| 1,267,915 | Shellabarger | May 28, 1918 |
| 1,494,778 | Enders | May 20, 1924 |
| 1,795,747 | Viken | Mar. 10, 1931 |
| 1,970,624 | Recker | Aug. 21, 1934 |
| 2,473,218 | Reichenbach | June 14, 1949 |